United States Patent
Zhang et al.

(10) Patent No.: US 12,360,975 B2
(45) Date of Patent: Jul. 15, 2025

(54) METHOD FOR DATA PROCESSING, DATABASE SYSTEM, COMPUTER EQUIPMENT, AND STORAGE MEDIUM

(71) Applicant: Hangzhou Hyperchain Technology Co., Ltd., Zhejiang (CN)

(72) Inventors: Kejie Zhang, Zhejiang (CN); Fanglei Huang, Zhejiang (CN); Wei Guo, Zhejiang (CN); Weiwei Qiu, Zhejiang (CN); Maifang Hu, Zhejiang (CN)

(73) Assignee: HANGZHOU HYPERCHAIN TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/614,117

(22) Filed: Mar. 22, 2024

(65) Prior Publication Data
US 2024/0320203 A1  Sep. 26, 2024

(30) Foreign Application Priority Data
Mar. 24, 2023 (CN) .......... 202310297624.3

(51) Int. Cl.
*G06F 16/22* (2019.01)
*G06F 16/23* (2019.01)

(52) U.S. Cl.
CPC ...... *G06F 16/2246* (2019.01); *G06F 16/2358* (2019.01)

(58) Field of Classification Search
CPC ........... G06F 16/2246; G06F 16/2255; G06F 16/2358; G06F 16/27; G06F 16/273; G06F 16/275; G06F 16/278; Y02D 10/00
See application file for complete search history.

(56) References Cited

U.S. PATENT DOCUMENTS

| | | | |
|---|---|---|---|
| 2020/0394177 A1 | 12/2020 | Maurer et al. | |
| 2022/0197892 A1* | 6/2022 | Freedman | G06F 16/27 |

FOREIGN PATENT DOCUMENTS

| | | |
|---|---|---|
| CN | 106462544 A | 2/2017 |
| CN | 108664223 A | 10/2018 |

(Continued)

OTHER PUBLICATIONS

Wang et al., "A Value-Attribute Mapping Method Based on Inverted Index", 2018, 6 pages, IEEE.

(Continued)

*Primary Examiner* — James E Richardson
(74) *Attorney, Agent, or Firm* — CANTOR COLBURN LLP

(57) ABSTRACT

A method for data processing, a database system, computer equipment and a storage medium. The method includes: by a first device, obtaining global page identifiers of n target data nodes to which a data modification set needs to be distributed, generating n pieces of mapping information corresponding to the n target data nodes, and sending the same to a management module; by the management module, generating n pieces of data modification information corresponding to the n pieces of mapping information, and sending data modification tasks in the n pieces of data modification information to second devices identified by second device identifiers in the n pieces of data modification information, so as to instruct the second devices to update data nodes.

19 Claims, 2 Drawing Sheets

(56) References Cited

FOREIGN PATENT DOCUMENTS

| | | | |
|---|---|---|---|
| CN | 110134550 A | 8/2019 | |
| CN | 112579602 A | 3/2021 | |
| CN | 112632029 A | 4/2021 | |
| CN | 114328540 A | 4/2022 | |
| CN | 114356927 A | 4/2022 | |
| CN | 115098893 A | 9/2022 | |
| CN | 115391329 A * | 11/2022 | |
| CN | 115794823 A | 3/2023 | |
| WO | 2021179488 A1 | 9/2021 | |
| WO | WO-2022134128 A1 * | 6/2022 | ......... G06F 16/2246 |
| WO | WO-2023124323 A1 * | 7/2023 | |

OTHER PUBLICATIONS

Design Method for Distributed Real-Time Trajectory Access System, Command Information System and Technology, vol. 7 No. 3, Jun. 2016, 6 pages.

Lei et al. Efficient Materialized View Maintenance and Trusted Query for Blockchain, Journal of Software, 2020, 15 pages.

\* cited by examiner

METHOD FOR DATA PROCESSING, DATABASE SYSTEM, COMPUTER EQUIPMENT, AND STORAGE MEDIUM

CROSS-REFERENCE TO RELATED APPLICATION

Pursuant to 35 U.S.C. § 119 and the Paris Convention, this application claims the benefit of Chinese Patent Application No. 202310297624.3 filed on Mar. 24, 2023, the content of which is incorporated herein by reference.

TECHNICAL FIELD

The present application relates to the field of database technologies, in particular, to a method for data processing, a database system, computer equipment and a storage medium.

BACKGROUND

The Merkle B+ tree is an improved tree structure based on the B+ tree, which contains two types of nodes: index nodes and data nodes in the last layer. In related technologies, an index node stores a minimum key and a hash value of its subordinate nodes, and a data node stores a key-value pair. Data stored by each node in the Merkle B+ tree may be stored on a disk in form of pages.

Currently, the database may be implemented based on the Merkle B+ tree, that is, the underlying storage engine of the database may be a Merkle B+ tree structure. However, when the amount of data continues to grow, the performance of the database will continue to decline due to the impact of the memory size and disk performance of the stand-alone machine after the accumulated data volume has reached a threshold value.

SUMMARY

The present application provides a method for data processing, a database system, computer equipment and a storage medium, which can at least improve the performance of the database system. Technical solutions of the present application include the following aspects:

In accordance with a first aspect of this disclosure, a method for data processing is provided, the method is applied to a database system, the database system includes a first device, a management module, and a data system, the data system includes a plurality of second devices. The first device is configured to store data of index nodes in a Merkle B+ tree, and the plurality of second devices are configured to store data of data nodes in the Merkle B+ tree. The method includes that:

The first device obtains a global page identifier of a target data node to which each specified data in a data modification set needs to be distributed in the Merkle B+ tree, to obtain the global page identifier of each of n target data nodes, where, n is a positive integer.

The first device generates n pieces of mapping information in a one-to-one correspondence with the n target data nodes, and sending the n pieces of mapping information to the management module. Each of the n pieces of mapping information includes a global page identifier of a corresponding target data node and a data list. The data list includes at least one specified data in the data modification set that needs to be distributed to the corresponding target data node.

The management module, after receiving the n pieces of mapping information sent by the first device, generates n pieces of data modification information in a one-to-one correspondence with the n pieces of mapping information. Each of the n pieces of data modification information includes a second device identifier associated with the global page identifier in corresponding mapping information and a data modification task. The data modification task includes a local page identifier associated with the global page identifier in the corresponding mapping information and a data list of the corresponding mapping information.

The management module sends a data modification task in any piece of the n pieces of data modification information to a second device identified by a second device identifier in this piece of data modification information, and the data modification task is used to indicate an update of the data nodes in the Merkle B+ tree.

In accordance with a second aspect of the disclosure, a database system is provided, the database system includes a first device, a management module and a data system. The data system includes a plurality of second devices, the first device is configured to store data of index nodes in a Merkle B+ tree, and the plurality of second devices are configured to store data of data nodes in the Merkle B+ tree.

The first device is configured to obtain a global page identifier of a target data node to which each specified data in a data modification set needs to be distributed in the Merkle B+ tree, so as to obtain the global page identifier of each of n target data nodes, where n is a positive integer; generate n pieces of mapping information in a one-to-one correspondence with the n target data nodes, and send the n pieces of mapping information to the management module. Each of the n pieces of mapping information includes a global page identifier and a data list of a corresponding target data node, and the data list includes at least one specified data in the data modification set that needs to be distributed to the corresponding target data node.

The management module, after receiving the n pieces of mapping information sent by the first device, is configured to generate n pieces of data modification information in a one-to-one correspondence with the n pieces of mapping information, each of the n pieces of data modification information includes a second device identifier associated with a global page identifier in corresponding mapping information and a data modification task, and the data modification task includes a local page identifier associated with the global page identifier in the corresponding mapping information and a data list in the corresponding mapping information; send a data modification task in any piece of the n pieces of data modification information to a second device identified by a second device identifier in this piece of data modification information. The data modification task is used to indicate an update of the data nodes in the Merkle B+ tree.

In accordance with a third aspect of the disclosure, a method for data processing is provided, the method is applied to a management module in a database system, the database system includes a first device, the management module, and a data system, and the data system includes a plurality of second devices. The first device is configured to store data of index nodes in a Merkle B+ tree, and the plurality of second devices are configured to store data of data nodes in the Merkle B+ tree. The method includes the following steps: receiving n pieces of mapping information sent by the first device, the n pieces of mapping information are in a one-to-one correspondence with n target data nodes, and the n target data nodes are data nodes to which specified data in the data modification set needs to be distributed in the Merkle B+ tree, each of the n pieces of mapping information includes a global page identifier and a data list of a corresponding target data node, and the data list includes at least one specified data in a data modification set that needs to be distributed to the corresponding target data node, where, n is a positive integer; generating n pieces of data modification information in a one-to-one correspondence with the n pieces of mapping information, each of the n pieces of data modification information comprises a second device identifier associated with a global page identifier in corresponding mapping information and a data modification task, where the data modification task includes a local page identifier associated with the global page identifier in the corresponding mapping information and a data list in the corresponding mapping information; and sending a data modification task in any piece of the n pieces of data modification information to a second device identified by the second device identifier in this piece of data modification information, where the data modification task is configured to indicate an update of the data nodes in the Merkle B+ tree.

In accordance with a fourth aspect of the disclosure, computer equipment is provided, the computer equipment includes a memory, a processor, and a computer program stored in the memory and executable by the processor. The computer program, when executed by the processor, enables operations performed by the first device, the management module or the second device in the method for data processing described in the first aspect to be implemented.

In accordance with a fifth aspect of the disclosure, a computer-readable storage medium is provided, in which a computer program is stored, and operations performed by the first device, the management module or the second device in the method for data processing described in the first aspect are implemented when the computer program is executed by a processor.

DETAILED DESCRIPTION

Figure 1:
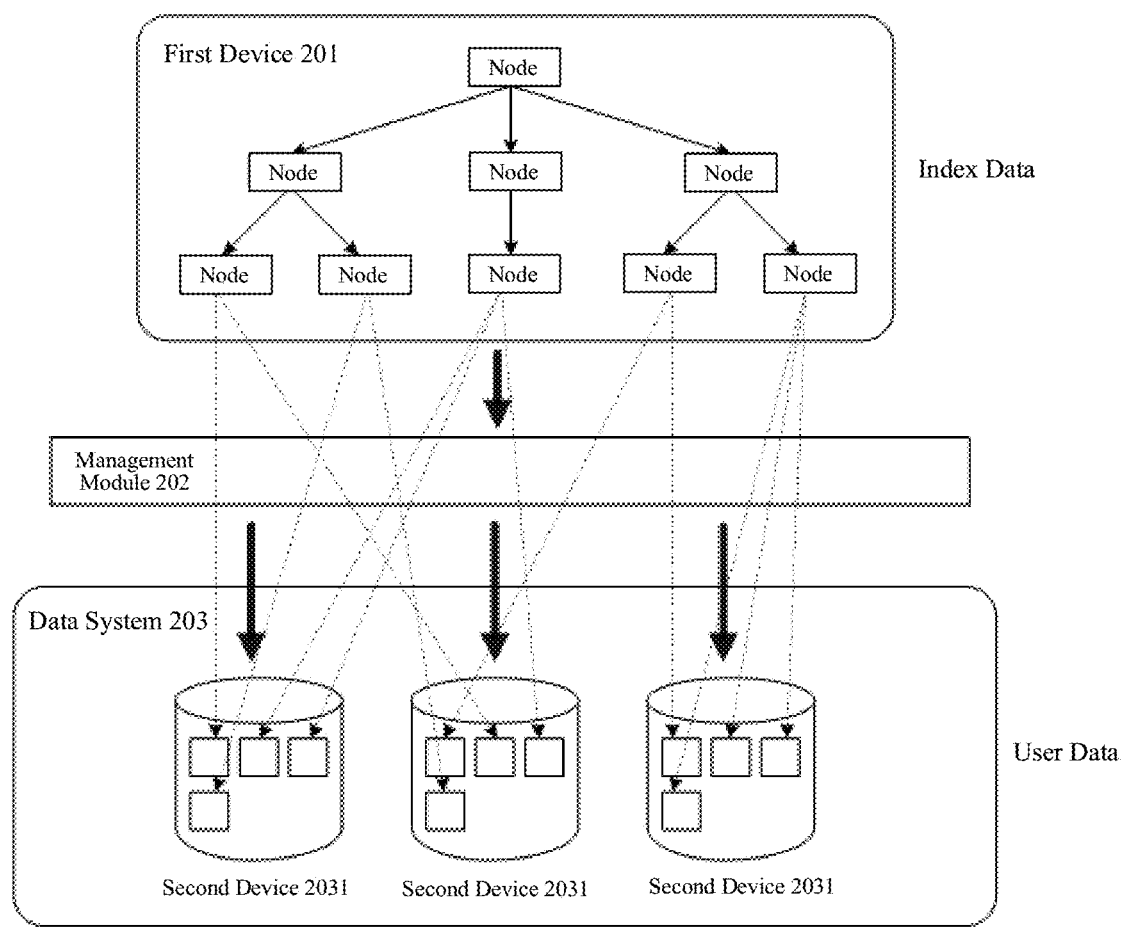
FIG. 1 is a schematic structural diagram of a database system in accordance with an embodiment of the present application.

In order to illustrate the objectives, technical solutions and advantages of the present application more clearly, implementations of the present application will be further described in detail below in conjunction with the accompanying drawings.

It should be understood that the term "multiple" mentioned in the present application means two or more. In the description of the present application, unless otherwise specified, the symbol "/" means or, for example, A/B may mean A or B. The term "and/or" in this disclosure is just a description of the relationship between associated objects, which means that there may be three kinds of relationships, for example, A and/or B, which may mean: A exists alone, A and B exist simultaneously, and B exists alone. In addition, to clearly describe the technical solution of the present application, words such as "first" and "second" are used to distinguish the same or similar items with basically the same function and effect. It can be understood for those skilled in the art that words such as "first" and "second" do not limit the quantity and execution order, and the words such as "first" and "second" are not necessarily different.

Phrases such as "one embodiment" or "some embodiments" described in the present application mean that a particular feature, structure, or characteristic described in the embodiment is included in one or more embodiments of the present application. In addition, the terms "including", "comprising", "having" and their variations all mean "including but not limited to", unless specifically stated otherwise.

Before detailed explanation of the embodiments of the present application, application scenarios of the embodiments of the present application are described first.

The embodiments of the present application may be applied in a scenario of data processing based on the Merkle B+ tree. For example, the execution module in the blockchain system, after executing all the transactions in a block, will generate a series of ledger modification sets. In this case, these ledger modification sets may be processed based on the Merkle B+ tree through the method for data processing provided by an embodiment of the present application.

Currently, the database can be implemented based on the Merkle B+ tree, that is, the underlying storage engine of the database can be a Merkle B+ tree structure. However, when the amount of data continues to grow, the performance of the database will continue to decline due to the impact of the memory size and disk performance of the stand-alone machine after the accumulated data volume has reached a threshold value.

For this reason, an embodiment of the present application provides a new database system, which is a new distributed horizontal expansion scheme based on the existing database basic process. This database system can breakthrough the bottleneck of stand-alone performances of the database and ensure the correctness of functions and protocols of the database at the same time, such as ensuring the correctness of various protocols such as data reading, writing, multi-version control, and fast rollback.

It should be noted that after the data of nodes in the Merkle B+ tree is stored to disk pages (also known as data pages), it is equivalent to that the logical tree of the Merkle B+ tree is saved in the disk. In this case, a page identifier (ID) of a root node (Merkle Root) in the Merkle B+ tree can be recorded, and data of all nodes in the Merkle B+ tree can be obtained from the disk according to the page identifier of the root node in the Merkle B+ tree, so the page identifier of the root node in the Merkle B+ tree can correspond to the logical tree of the Merkle B+ tree stored in the disk. When the Merkle B+ tree is updated in the future, a new version of the logical tree of the Merkle B+ tree will be saved in the disk every time it is updated, and a page identifier of the root node corresponding to this version of the logical tree (i.e., a page identifier of the root node in an updated Merkle B+ tree) will be recorded. In this case, not only the latest version of the logic tree is saved in the disk, but also at least one historical version of the logic tree is saved. The page identifier of the root node corresponding to the latest version of the logical tree can be recorded, and the page identifier of the root node corresponding to each of the at least one historical version of the logical tree can also be recorded.

Since the Merkle B+ tree is equivalent to saving multiple logical trees in the disk in terms of multi-version control and data rollback, when the Merkle B+ tree needs to be rolled back to a certain version, it only needs to direct the current root node to the root node of this version of the logical tree.

The database system provided by an embodiment of the present application retains functions that have already been supported by the existing independent database based on Merkle B+ tree (which may be referred to as verified independent database (vidb)), so as to ensure that the database system is suitable for existing systems that need to use Merkle B+ tree for data processing. For example, the database system may be suitable for a blockchain system, and the blockchain system may read and write data to the database system. For example, the blockchain system may query data from the database system, add data to the database system, update or delete data in the database system.

The data of the Merkle B+ tree includes index data and user data. Index data refers to data of the index nodes. User data refers to data of the data nodes. Correspondingly, the index data and user data are also stored in the disk. The size of index data is generally much smaller than the size of user data due to structural characteristics of the Merkle B+ tree. Therefore, from the perspective of disk pressure and memory management, the distributed horizontal expansion scheme in the database system provided by the embodiment of the present application starts with the user data to improve the existing independent database.

FIG. 1 is a schematic structural diagram of a database system provided by an embodiment of the present application. Referring to FIG. 1, the database system may include: a first device 201, a management module 202, and a data system 203. The data system 203 may include a plurality of second devices 2031.

The first device 201 may communicate with the management module 202 through a wired connection or a wireless connection. The management module 202 may communicate with the data system 203, for example, the management module 202 may communicate with each second device 2031 in the data system 203 through a wired connection or a wireless connection.

The first device 201 may also be called a host. The first device 201 is configured to store the index data of the Merkle B+ tree, that is, to store the data of the index nodes in the Merkle B+ tree. Specifically, the first device 201 may store the data of each index node in the Merkle B+ tree to disk pages in the disk of the first device 201. Optionally, the first device 201 may be connected to an external module to process the user data sent by the external module that needs to be processed. For example, the first device 201 may be connected to an execution module in the blockchain system to process a ledger modification set sent by the execution module.

The first device 201 maintains functions of index data management and index file storage. The index data is managed in logical nodes in a memory of the first device 201, and organized in units of disk pages on the disk of the first device 201. A disk page may also be referred to as a page, which is usually a 4K byte array. Each disk page in the first device 201 has a unique page identifier in the first device 201. In the embodiments of the present application, since the data of all index nodes in the Merkle B+ tree are stored in the disk pages of the first device 201, the page identifier of an index node in the Merkle B+ tree is used as a unique identifier for a disk page that stores the data of this node in the disk of the first device 201.

The second device 2031 may also be called a data fragmentation server. The second device 2031 is configured to store the user data of the Merkle B+ tree, that is, to store the data of the data nodes in the Merkle B+ tree. Specifically, the second device 2031 may store the data of the data nodes in the Merkle B+ tree to disk pages in the disk of the second device 2031. The plurality of second devices 2031 in the data system 203 are configured to store the data of all data nodes in the Merkle B+ tree. Optionally, each second device 2031 may be a physical machine having an independent processor, a memory and disk resources. The second device 2031 maintains user data and is responsible for reading and writing user data.

The second device 2031 maintains functions of data management and data file storage. The user data is managed in logical nodes in a memory of the second device 2031, and organized in units of disk pages on the disk of the second device 2031. Each disk page in the second device 2031 has a unique page identifier in the second device 2031 (that may be referred to as a local page identifier), and also has a unique page identifier in an entire data system 203 (that may be referred to as a global page identifier). Under the distributed architecture provided by an embodiment of the present application, the global page identifier needs to be able to represent second device information and disk page information, that is, the global page identifier is configured to identify a certain disk page in a certain second device 2031, this can be achieved by associating the global page identifier with a second device identifier and the local page identifier. In the embodiments of the present application, since the data of all data nodes in the Merkle B+ tree are stored in the disk pages of the second device 2031 in the data system 203, the second device identifier and the local page identifier in association with a global page identifier of a data node in the Merkle B+ tree may uniquely position to a disk page in a second device 2031 in the data system 203.

The management module 202 is connected upwardly to the first device 201 and downwardly to the data system 203. The management module 202 may be an independent physical machine. The management module 202 may receive, process and reply all instructions related to user data sent by the first device 201 (including but not limited to data query instructions, data modification instructions, data rollback instructions, etc.). The management module 202 may broadly manage the data system 203. For example, the management module 202 may internally maintain device topology meta-information of the data system 203, a control for allocation of disk pages inside each second device 2031, and a control for execution progress of each second device 2031. In an embodiment, the device topology meta-information of the data system 203 is configured to indicate an underlying topology of the second device 2031 in the data system 203, and the device topology meta-information of the data system 203 may include the number of devices of the plurality of second devices 2031 in the data system 203, may also include a device identifier of each second device 2031 among the plurality of second devices 2031 in the data system 203 and the like. The control of the management module 202 for the allocation of disk pages inside the second device 2031 means that the management module 202 allocates disk pages for data in the data nodes in the second device 2031 for storage. Optionally, a freelist component may be used to allocate page identifiers to the data nodes, to store the data of the data node on the disk page identified by the allocated page identifier, for example, the freelist component is used to configure a list of free page identifiers, a list of page identifiers to be released, and a maximum page identifier. The control for execution progress of the second device 2031 by the management module 202 means that the management module 202 manages the execution progress of the second device 2031 on modification operations of data of the data nodes.

In some embodiments, the execution module in the blockchain system will generate a key (i.e., a key value) that needs to be queried during an execution of a transaction in a certain block, and the execution module may send a data query request carrying the key value to be queried to the first device 201. The first device 201, after receiving the data query request, may query a value value corresponding to the key value carried in the data query request from the plurality of second devices 2031 through the management module 202 according to the identifier of the root node in the latest version of the Merkle B+ tree, and return the value to the execution module.

In some embodiments, the execution module, after executing all transactions in a certain block, will generate a series of ledger modification sets and these ledger modification sets may include key-value pairs that need to be added, key-value pairs that need to be updated, and/or keys that need to be deleted, etc. In this case, the execution module may send a data modification request carrying a ledger modification set to the first device 201. The first device 201, after receiving the data modification request, may determine that the execution progress of this block is in execution, and then update the user data stored in the plurality of second devices 2031 and the index data stored in the first device 201 (that is, update the Merkle B+ tree) through the management module 202 according to the page identifier of the root node in the latest version of the Merkle B+ tree and the key-value pairs and/or keys in this ledger modification set. The first device 201, after completing the update of the Merkle B+ tree, may determine that the execution progress of this block is in a completed state. Afterwards, if the plurality of second devices 2031 store the updated user data in the disk pages and the first device 201 also stores the updated index data in the disk pages, the persistence of the updated Merkle B+ tree is realized, then the first device 201 may determine that the execution progress of this block is in a placed-on-disk state.

It can be seen from the above that, in the embodiments of the present application, the first device 201, after receiving the ledger modification set corresponding to a block, can determine that the execution progress of this block is in execution. Afterwards, the first device 201 may start from the root node to complete the update of the Merkle B+ tree according to the ledger modification set through cooperation with the management module 202 and the plurality of second devices 2031, that is, the flow of execution for this block is completed, at this time, the execution progress of this block is in a completed state. After the update of the Merkle B+ tree is completed, if the persistence of the updated Merkle B+ tree is completed by the first device 201 and the plurality of second devices 2031, then the process of placing this block is completed, at this time, the execution progress of this block is in a placed-on-disk state.

It should be noted that in this database system, since the first device 201 is responsible for an index data layer (i.e., an index layer), and the data system 203 is responsible for a user data layer (i.e., a data layer), the behavior of the index layer and the behavior of the data layer may be natural concurrently. In this way, the database system has a high degree of concurrency in the execution process of a block.

It should be noted that the above database system can theoretically achieve unlimited horizontal expansion, that is, the second device 2031 in the data system 202 may be dynamically added to ensure that the database system maintains a stable throughput capacity and achieves stable performance when the amount of data continues to increase.

In addition, when the database system is connected to the blockchain system, since a natural global clock of block identifier (such as block number) is existed in the blockchain system, the dynamic adding of the second devices 2031 in the data system 203 may be realized according to the block identifier. Specifically, if a device addition request carrying a target device identifier is received by the first device 201 in the database system, then the first device 201 may first determine a block identifier corresponding to the ledger modification set currently being processed, and the block identifier corresponding to the ledger modification set is used to indicate which block the ledger modification set is generated after transactions in that block are executed by the execution module in the blockchain system. The first device 201 instructs the management module 202 to add the target device identifier carried in the device addition request to the device topology meta-information of the data system 203 after the process of the ledger modification set corresponding to the block identifier is completed by the first device, i.e., after the update of the Merkle B+ tree is completed according to the ledger modification set corresponding to the block identifier. After the target device identifier is added to the device topology meta-information of the data system 203, the device identified by the target device identifier can be added to the data system 203, at this time, the device identified by the target device identifier may be referred to as the second device 2031, so that the first device 201, when processing the ledger modification set corresponding to the next block identifier, can process according to a new underlying topology of the data system 203. In this way, the horizontal expansion function transparent to the blockchain system can be realized.

For example, the first device 201, after receiving the device addition request carrying the target device identifier, needs to determine the execution progress of the current block. If the execution progress of the current block is not in a completed state, then the first device 201 needs to wait until the execution progress of the current block is in the completed state, and then determine a block identifier of the next block of the latest executed block. Then, the device addition instruction carrying the target device identifier and the block identifier (which may be referred to as a specified block identifier) is sent by the first device 201 to the management module 202, to indicate an addition of a device identified by the target device identifier and to indicate that the newly-added device is enabled from a block identified by the specified block identifier. The management module 202, after receiving the device addition instruction, may add the specified block identifier and the target device identifier to the device topology meta-information of the data system 203, and may also add the number of the second devices 2031 in the data system 203 into which the new device is added, to the device topology meta-information of the data system 203, so that a subsequent execution of a block whose block identifier is greater than or equal to the specified block identifier may be performed based on the data system 203 into which the new device is added.

It should be noted that, before new devices are added in the data system 203, the management module 202 may also determine the maximum global page identifier that has been allocated.

The management module 202 may determine the maximum global page identifier that has been allocated as a demarcation point of global page identifier, and the demarcation point of global page identifier has a corresponding number of old devices (that is, the number of the second devices 2031 in the data system 203 before an addition of devices) and the number of new devices (that is, the number of the second devices 2031 in the data system 203 after the addition of devices).

The management module 202 may determine a limit local page identifier of each second device 2031 according to the demarcation point of global page identifier. The limit local page identifier of each second device 2031 is the maximum local page identifier corresponding to the global page identifier in each second device 2031 that is smaller than or equal to the demarcation point of global page identifier. Specifically, the management module 202 may perform a modulo operation on the demarcation point of global page identifier and the number of old devices to obtain a second device identifier, and round down a value obtained after dividing the demarcation point of global page identifier by the number of old devices to obtain the local page identifier, then set the limit local page identifier of a second device 2031 whose device identifier is smaller than or equal to the second device identifier as the local page identifier, and set the limit local page identifier of a second device 2031 whose device identifier is greater than the second device identifier as a local page identifier that is 1 smaller than the local page identifier.

The management module 202 may determine a preset value of each second device 2031. For the initial plurality of second devices 2031 in the data system 203, the preset value of each second device 2031 is 0. Before a new device is added in the data system 203, the management module 202 may determine a preset value of the new second device 2031 as currently-added according to the limit local page identifier of each second device 2031. The preset value of the new second device 2031 as currently-added is the global page identifier corresponding to the local page identifier that is 1 greater than the limit local page identifier of the second device 2031 having the minimum device identifier in the data system 203 after the new device is added. Optionally, the management module 202 may add the maximum limit local page identifier among the limit local page identifiers of each second device 2031 to 1, and then multiply the above result by the number of new devices corresponding to the demarcation point of global page identifier, to obtain the preset value of the new second device 2031 as currently-added.

Through the above process, the management module 202 obtains the specified block identifier, the target device identifier, the demarcation point of global page identifier, and the limit local page identifier of each second device 2031 (that is, the limit local page identifier corresponding to the device identifier of each second device 2031), the number of old devices corresponding to the demarcation point of global page identifier, the number of new devices corresponding to the demarcation point of global page identifier, and the preset value of the newly-added device (that is, the preset value corresponding to the target device identifier). These pieces of information are device dynamic information generated when a new device is added, and the management module 202 may also record the device dynamic information in the device topology meta-information of the data system 203.

In this case, during an execution of a block whose block identifier is greater than or equal to the specified block identifier, if a global page identifier sent by the first device 201 is received by the management module 202, then the management module 202 may perform a modulo operation on the number of old devices corresponding to the global page identifier and the demarcation point of global page identifier to obtain the second device identifier and then round down a value obtained after subtracting the preset value corresponding to the second device identifier from the global page identifier and dividing a result of the above subtraction operation by the number of old devices to obtain the local page identifier, in case that the global page identifier is smaller than or equal to the demarcation point of global page identifier; and the management module 202 may perform a modulo operation on the number of new devices corresponding to the global page identifier and the demarcation point of global page identifier to obtain the second device identifier, and then round down a value obtained after subtracting the preset value corresponding to the second device identifier from the global page identifier and dividing a result of the above subtraction by the number of new devices to obtain the local page identifier, in case that the global page identifier is greater than the demarcation point of global page identifier.

In this case, during the execution of a block whose block identifier is greater than or equal to the specified block identifier, if a local page identifier is allocated by the management module 202 to a data node in a second device 2031, then the management module 202 may perform an accumulation of the device identifier of this second device 2031, the preset value corresponding to the device identifier of this second device 2031, and a value obtained through an operation of multiplying the local page identifier by the number of old devices corresponding to the demarcation point of global page identifier, to obtain the global page identifier, if the second device 2031 is not the newly-added second device 2031 (that is, a device identifier of the second device 2031 is not the target device identifier) and the local page identifier is smaller than or equal to the limit local page identifier of this second device 2031; and the management module 202 may perform an accumulation of the device identifier of this second device 2031, the preset value corresponding to the device identifier of this second device 2031, and a value obtained through an operation of multiplying the local page identifier by the number of new devices corresponding to the demarcation point of global page identifier, to obtain the global page identifier if the second device 2031 is not the newly-added second device 2031 and the local page identifier is greater than the limit local page identifier of this second device 2031. In case that the second device 2031 is the newly added second device 2031, the management module 202 may perform an accumulation of the device identifier of this second device 2031, the preset value corresponding to the device identifier of this second device 2031, and the value obtained through the operation where the local page identifier is multiplied by the number of new devices corresponding to the demarcation point of global page identifier, to obtain the global page identifier.

It should be noted that during the operation of the database system, the second device 2031 may be added to the data system 203 for multiple times, and every time a second device 2031 is added into the data system 203, the management module 202 will add a piece of device dynamic information into the device topology meta-information of the data system 203. In this way, the device topology meta-information of the data system 203 includes multiple pieces of device dynamic information, the multiple pieces of device dynamic information are recorded in sequence, and each piece of device dynamic information includes a specified block identifier, a target device identifier, a demarcation point of global page identifier, a limit local page identifier of each second device 2031, the number of old devices and the number of new devices corresponding to the demarcation point of global page identifier, and a preset value corresponding to the target device identifier.

In this case, when the management module 202 is configured to convert a global page identifier into a second device identifier and a local page identifier, if the global page identifier is smaller than the demarcation point of global page identifier in the earliest recorded device dynamic information among the multiple pieces of device dynamic information, then the management module 202 may perform a modulo operation on the global page identifier and the number of old devices corresponding to the demarcation point of global page identifier in the earliest recorded device dynamic information to obtain the second device identifier, and then round down a value obtained after subtracting the preset value corresponding to the second device identifier from the global page identifier and dividing a result of the above subtraction operation by the number of the old devices, to obtain the local page identifier. If the global page identifier is greater than the demarcation point of global page identifier in the latest recorded device dynamic information among the multiple pieces of device dynamic information, the management module 202 may perform a modulo operation on the global page identifier and the number of new devices corresponding to the demarcation point of global page identifier in the latest recorded device dynamic information to obtain the second device identifier, and then round down a value obtained after subtracting the preset value corresponding to the second device identifier from the global page identifier and dividing a result of the above subtraction operation by the number of the new devices, to obtain the local page identifier. If the global page identifier is greater than the demarcation point of global page identifier in one piece of device dynamic information among the multiple pieces of device dynamic information and smaller than or equal to the demarcation point of global page identifier in the next piece of device dynamic information sequentially recorded after this piece of device dynamic information, then the management module 202 may perform a modulo operation on the global page identifier and the number of new devices corresponding to the demarcation point of global page identifier in this piece of device dynamic information to obtain the second device identifier, and then round down a value obtained after subtracting the preset value corresponding to the second device identifier from the global page identifier, and dividing a result of the above subtraction operation by the number of the new device to obtain the local page identifier.

When the management module 202 is configured to convert one second device identifier and one local page identifier into a global page identifier, if the second device identifier is different from the target device identifier in each of the multiple pieces of device dynamic information, then it is indicated that the second device 2031 identified by the second device identifier is an initial second device 2031 in the data system 203, and then the management module 202 is configured to perform an accumulation of the second device identifier, the preset value corresponding to the second device identifier, and a value obtained by multiplying the local page identifier with the number of old devices corresponding to the demarcation point of global page identifier in the earliest recorded device dynamic information, to obtain the global page identifier in case that the local page identifier is smaller than or equal to the limit local page identifier corresponding to the second device identifier in the earliest recorded device dynamic information among the multiple pieces of device dynamic information. If the second device identifier is different from the target device identifier in each of the multiple pieces of device dynamic information, and the local page identifier is greater than the limit local page identifier corresponding to the second device identifier in the latest recorded device dynamic information among the multiple pieces of device dynamic information, then the management module 202 is configured to perform an accumulation of the second device identifier, the preset value corresponding to the second device identifier, and a value obtained by multiplying the local page identifier with the number of new devices corresponding to the demarcation point of global page identifier in the latest recorded device dynamic information, to obtain the global page identifier. If the second device identifier is different from the target device identifier in each of the multiple pieces of device dynamic information, and the local page identifier is greater than the limit local page identifier corresponding to the second device identifier in this piece of device dynamic information and smaller than the limit local page identifier corresponding to the second device identifier in the next piece of device dynamic information sequentially recorded after this piece of device dynamic information, then the management module 202 is configured to perform an accumulation of the second device identifier, the preset value corresponding to the second device identifier, and a value obtained by multiplying the local page identifier with the number of new devices corresponding to the demarcation point of global page identifier in this piece of device dynamic information, to obtain the global page identifier. If the second device identifier is the same as the target device identifier in any piece of the multiple pieces of device dynamic information, then the management module 202 is configured to perform an accumulation of the second device identifier, the preset value corresponding to the second device identifier, and a value obtained by multiplying the local page identifier with the number of new devices corresponding to the demarcation point of global page identifier in the device dynamic information, to obtain the global page identifier.

The process of constructing an initial Merkle B+ tree based on the database system is described below, which may include the following steps (1) to (5):

(1) Multiple key-value pairs to be stored are obtained by a first device.

The multiple key-value pairs are key-value pairs that need to be stored based on the Merkle B+ tree. The multiple key-value pairs are key-value pairs used to construct an initial Merkle B+ tree.

The multiple key-value pairs may be sent to the first device by other systems. For example, the execution module in the blockchain system, after executing all transactions in a block, will generate a series of ledger modification sets, and these ledger modification sets may include multiple key-value pairs that need to be stored. In this case, the execution module in the blockchain system may enable the data storage request to carry the multiple key-value pairs and then send the data storage request carried with the multiple key-value pairs to the first device to instruct the first device to store the multiple key-value pairs based on the Merkle B+ tree, and then an initial Merkle B+ tree can be constructed by the first device according to the multiple key-value pairs.

The natural global clock of block identifier (such as block number) is existed in the blockchain system, and the block identifier is continuously incremented. In some embodiments, the data storage request may carry a block identifier, and the block identifier is used to indicate which block the data storage request is generated after the transaction in that block is executed. The first device may determine the block identifier carried in the data storage request as the block identifier of the current block, and may determine that the execution progress of the current block is in execution.

(2) The first device sends a data storage instruction carrying the multiple key-value pairs to a management module.

The data storage instruction is used to indicate that the data nodes in the initial Merkle B+ tree needs to be constructed according to the multiple key-value pairs to be stored. Constructing the data nodes in the Merkle B+ tree according to the multiple key-value pairs means storing the multiple key-value pairs in the data nodes in the Merkle B+ tree.

Data nodes in a Merkle B+ tree contain key-value pairs. Data nodes have a minimum key and a hash value. The minimum key of the data nodes has a minimum key value among the key values of all key-value pairs contained in the data nodes. Optionally, the hash value of the data nodes is the hash value of the data obtained by splicing all the key-value pairs contained in the data nodes, or the hash value of the data nodes is the hash value of the data obtained by splicing value values of all the key-value pairs stored in the data nodes.

Index nodes in a Merkle B+ tree contain minimum keys and hash values of all subordinate nodes. The index nodes have a minimum key and a hash value. The minimum key of the index nodes has a minimum key value among the minimum keys of all subordinate nodes. The hash value of the index nodes is the hash value of the data obtained by splicing the hash values of all subordinate nodes.

(3) The management module, after receiving the data storage instruction sent by the first device, sends the multiple key-value pairs to a second device in the data system.

Optionally, the management module may randomly select a second device from the data system, and send the multiple key-value pairs to the second device.

Alternatively, the management module may select a second device having the minimum device identifier according to the device identifier of each second device in the data system, and send the plurality of key-value pairs to the second device. For example, if the number of second devices in the data system is 10, and the device identifiers of these ten second devices are 0 to 9, the management module may send the multiple key-value pairs to the second device whose device identifier is 0.

(4) The second device, after receiving the multiple key-value pairs, constructs data nodes according to the multiple key-value pairs, and sends a disk page allocation request to the management module.

The process of constructing a data node based on the multiple key-value pairs by the second device is similar to the process of constructing a data node based on some key-value pairs by a certain device in the related arts, which will not be described in detail in the embodiments of the present application.

It should be noted that, in the process of constructing data nodes based on the multiple key-value pairs, the second device instead of allocating page identifiers to the constructed data nodes directly, sends the disk page allocation request to the management module, to request the management module to allocate a page identifier for each of the constructed data nodes. The disk page allocation request carries the minimum key and hash value of each of the constructed data nodes. The disk page allocation request is used to request allocation of a page identifier for each of the constructed data nodes, that is, to request allocation of a disk page for storing data of each of the constructed data nodes.

In addition, a data volume of each data node constructed by the second device is smaller than or equal to a preset data volume. The preset data volume may be set in advance, for example, the preset data volume may be the same as a storage space size (e.g., 4K) of the disk page.

(5) The management module, after receiving the disk page allocation request sent by the second device, allocates a global page identifier to each data node indicated in the disk page allocation request, and sends a data storage result to the first device.

Optionally, the management module internally maintains a freelist component for the second device, and the freelist component of the second device is used to configure a list of free page identifiers, a list of page identifiers to be released, and a maximum page identifier of the second device. The device's freelist component is used to implement the allocation of disk pages in this second device. The management module may allocate a local page identifier in the second device to each data node constructed by the second device through the freelist component of the second device, to realize the allocation of disk pages for the constructed data nodes in the second device.

After the management module allocates a local page identifier in the second device to a data node indicated in the disk page allocation request, the data node has a second device identifier (that is, a device identifier of the second device) and a local page identifier, to indicate that a disk page identified by the local page identifier is allocated to the data node in the second device identified by the second device identifier, that is, to indicate that the data of the data node is stored in the disk page identified by the local page identifier in the second device identified by the second device identifier.

In this case, the local page identifier allocated to each data node indicated by the disk page allocation request and the corresponding second device identifier may be carried in a disk page allocation result to be returned by the management module to the second device.

The second device, after receiving the disk page allocation result, determines that the second device identifier in the disk page allocation result is the same as the device identifier of the second device, then the second device may store the data of each data node to the disk page identified by the local page identifier among the disk pages of the second device according to the local page identifier of each data node in the disk page allocation result.

The management module, after allocating the local page identifier in the second device to a constructed data node, may also determine the associated global page identifier according to the device identifier of the second device and the local page identifier. Then, the management module may send the data storage result to the first device, where the data storage result includes the minimum key, hash value and global page identifier of each constructed data node. The first device, after receiving the data storage result, may construct index nodes according to the minimum key, the hash value and the global page identifier of each data node in the data storage result.

During the process of constructing the index node, the first device may allocate a page identifier to each of the constructed index nodes, and the page identifier of any index node is used to identify a disk page used to store the data of this index node in the first device in a later process. In this case, for any index node, the first device may also add the page identifier of the index node and the page identifier of each node subordinate to the index node to the data of the index node. In addition, a data volume of each index node constructed by the first device is smaller than or equal to a preset data volume.

The first device may store the data of each constructed index node in a disk page of the first device. Specifically, the first device may store the data of the respective constructed index node in the disk page identified by the page identifier of the respective index node in the first device.

It should be noted that after the second device stores the data of each constructed data node in the respective disk page of the second device, the persistence of the data nodes in the Merkle B+ tree is realized. After the first device stores the data of each constructed index node in the respective disk page of the first device, the persistence of the index nodes in the Merkle B+ tree is realized.

The second device stores the data of each data node in the Merkle B+ tree to the respective disk page of the second device, and the first device stores the data of each index node in the Merkle B+ tree to the respective disk page of the first device, which is equivalent to that the logical tree of this version of the Merkle B+ tree is saved in the disk. In this case, the first device may also record the page identifier of the root node in the Merkle B+ tree, and according to the page identifier of the root node in the Merkle B+ tree, data of all nodes in the Merkle B+ tree may be obtained layer by layer through the root node, that is, the data of all nodes in the Merkle B+ tree may be obtained from the disk, so the page identifier of the root node in the Merkle B+ tree may correspond to the logical tree of this version of the Merkle B+ tree saved in the disk.

It should be noted that the first device after constructing the root node, may obtain the data of the root node, and at this time, the first device may determine that the execution progress of the current block is in a completed state. Afterwards, the first device may obtain the hash value of the root node according to the data of the root node, and return the hash value of the root node to an upper blockchain system. Moreover, the first device may also record a mapping relationship between the page identifier of the root node and the block identifier of the current block, so as to determine which version of the Merkle B+ tree the page identifier of the root node corresponds to. The blockchain system after receiving the hash value of the root node sent by the first device, may determine that the execution of the current block has been completed, and at this time, the blockchain system can start to execute a next block.

In addition, the second device after storing the data of each constructed data node in the respective disk page of the second device, may send a persistence completion message to the management module. Afterwards, the management module may send the persistence completion message to the first device. The first device, after receiving the persistence completion message, determines that the execution progress of the current block is in a placed-on-disk state in case that the data of each constructed index node has been stored in the respective disk page. Afterwards, the first device sends the persistence completion message to the blockchain system to indicate that the current block has been placed on the disk.

After the initial Merkle B+ tree is constructed through the above steps, and the data of all nodes in the Merkle B+ tree are saved in the disk, the subsequent data processing may be performed based on the Merkle B+ tree. The method for data processing provided by an embodiment of the present application is illustrated in detail below.

Figure 2:
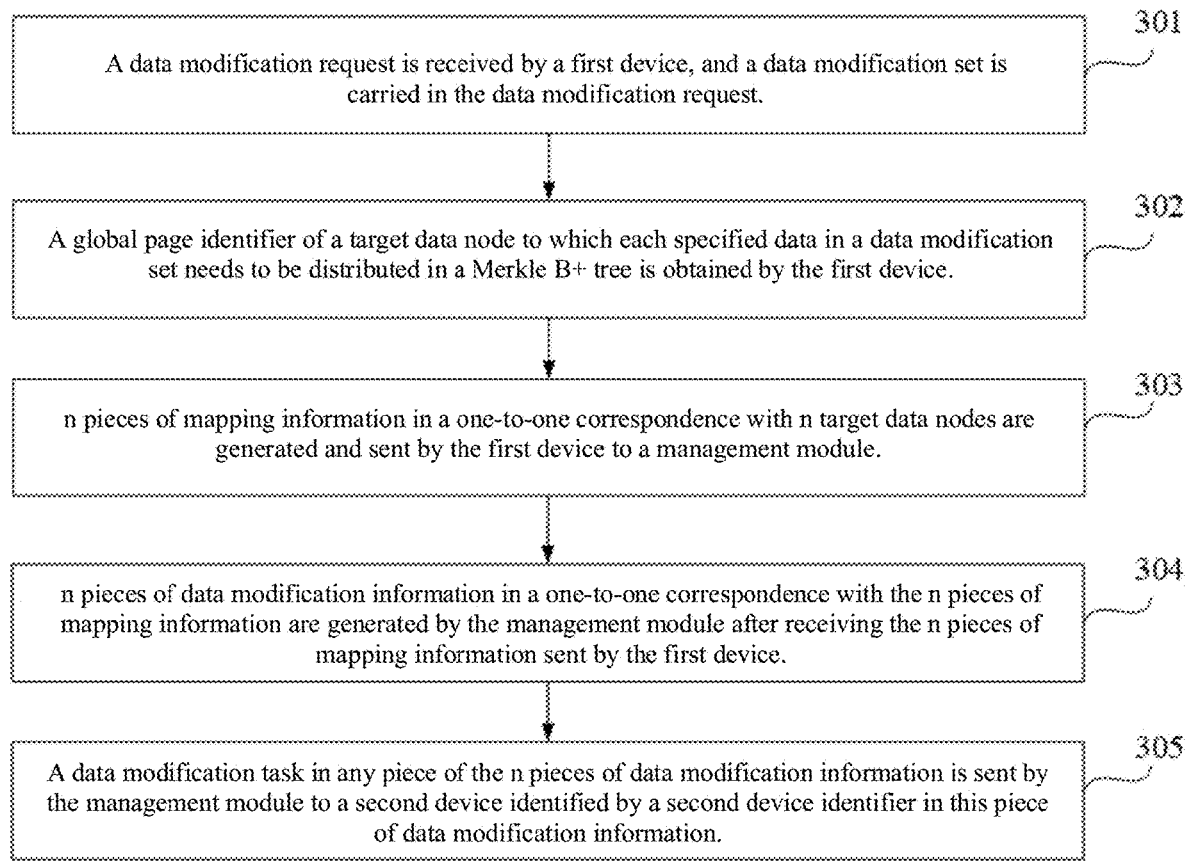
FIG. 2 is a flowchart of a method for data processing in accordance with an embodiment of the present application.

FIG. 2 is a flowchart of a method for data processing provided by an embodiment of the present application, and the method may be applied to the database system shown in FIG. 1. Referring to FIG. 2, the method includes the following steps 301 to 305.

In step 301, a data modification request is received by the first device, and a data modification set is carried in the data modification request.

The data modification request is used to indicate that the Merkle B+ tree needs to be updated based on the data modification set carried in the data modification request. The data modification set may include at least one specified data, and any specified data may be a key-value pair to be added, a key-value pair to be updated, or a key to be deleted. For example, types of the key value and value value in the specified data may both be byte array types.

The data modification request may be sent to the first device by other systems. For example, the execution module in the blockchain system, after executing all transactions in a block, will generate a series of ledger modification sets. The ledger modification sets may include key-value pairs that need to be added, key-value pairs that need to be updated, and/or keys that need to be deleted. In this case, the execution module may send a data modification request carrying a ledger modification set (that is, the aforementioned data modification set) to the first device. Optionally, the data modification request may also carry a block identifier, which is used to indicate which block the data modification request is generated after the transaction in that block is executed. The block identified by the block identifier in the data modification request is the block corresponding to the data modification set in the data modification request, and the process of updating the Merkle B+ tree based on the data modification set is a part of the execution process of the block corresponding to the data modification set. The first device may determine the block identifier carried in the data modification request as the block identifier of the current block, and determine that the execution progress of the current block is in execution.

Optionally, the Merkle B+ tree in the embodiment of the present application may support batch modification. In this case, the number of specified data included in the data modification set may be multiple, that is, the data modification set includes multiple key-value pairs to be added, multiple key-value pairs to be updated, and/or multiple keys to be deleted, hereby, a concurrent update of the nodes in the Merkle B+ tree can be realized.

In step 302, a global page identifier of a target data node to which specified data in the data modification set needs to be distributed in the Merkle B+ tree is obtained by the first device.

In this way, the first device may obtain the global page identifier of each target data node among all target data nodes (which may be referred to as n target data nodes, where n is a positive integer) to which all specified data in the data modification set needs to be distributed.

The global page identifier of one target data node is used to uniquely identify the disk page storing the data of the target data node among all the disk pages of the second device in the data system. In some embodiments, the first device may not only determine the global page identifier of the target data node, but also determine overflow information of the target data node, where the overflow information is used to indicate an actual number of disk pages corresponding to the target data node, that is, the data of the target data node is stored in several contiguous disk pages. Generally, the amount of data that can be stored in the disk pages are in consistent. For example, the amount of data that can be stored in the disk pages may all be a preset amount of data (including but not limited to 4K). In this case, if a data volume of a data node in condition of containing only one key-value pair is greater than a preset data volume, then multiple consecutive disk pages may be allocated to store the data of this data node. In this case, this data node not only has a global page identifier, but also has overflow information, for example, if the overflow information is 2, then it is indicated that the data of this data node is stored in two consecutive disk pages. And if the data volume of a data node is smaller than or equal to the preset data volume, a disk page may be normally allocated to store the data of this data node. In this case, this data node has a global page identifier, but does not have overflow information. Or the overflow information of this data node is 1, which is used to indicate that the data of this data node is stored in a disk page.

It should be noted that the data of all index nodes in the Merkle B+ tree are stored in the disk pages of the first device. Therefore, in the embodiments of the present application, the page identifier of an index node in the Merkle B+ tree is used uniquely identify the disk page that stores the data of this index node among the disk pages of the first device. In addition, if a subordinate node of an index node is also an index node, the data of the index node includes the page identifier of the index node itself and the page identifiers of each index node subordinate to the index node. If the subordinate node of an index node is a data node, the data of the index node includes the page identifier of the index node itself and the page identifier (i.e., the global page identifier) of each data node subordinate to the index node.

Optionally, the operation of step 302 may be that the first device obtains the data of the root node stored in the disk page of the first device according to the page identifier of the root node in the Merkle B+ tree; and for any specified data in the data modification set, the first device obtains the global page identifier of the target data node to which the specified data needs to be distributed according to the data of the root node and the key value in the specified data.

The data of the root node includes the page identifier of the root node, the minimum key and hash value of each node subordinate to the root node, and the page identifier of each node subordinate to the root node.

In this case, for a key value in any specified data in the data modification set, the first device may compare the key value with a key range of each node subordinate to the root node to determine that the key value is in the key range of which node subordinate to the root node, that is, to determine which node subordinate to the root node that the specified data to which the key value belongs needs to be distributed.

If the node is a data node, then the first device may determine that the data node is the target data node to which the specified data needs to be distributed, and then the first device may obtain the page identifier of the data node from the data of the root node, and then the global page identifier of the target data node to which the specified data needs to be distributed is obtained.

If the node is an index node, the first device may obtain the data of the index node stored in the disk page of the first device according to the page identifier of the index node included in the data of the root node. After that, the first device may continue to compare the key value with the key range of each node subordinate to the index node according to the data of the index node, so as to determine that the key value is in the key range of which node subordinate to the index node, that is, to determine which node subordinate to the index node that the specified data to which the key value belongs needs to be distributed. In this case, if the node is an index node, then the above process is repeated until it is determined that the key value is in a key range of a data node. At this time, the first device may determine that the data node is the target data node to which the specified data needs to be distributed, and obtain the page identifier of the data node from the data of the index node to which the data node is subordinate, and also obtain the global page identifier of the target data node to which the specified data needs to be distributed.

It should be noted that the above process of obtaining the global page identifier of the target data node according to the key value is a process of distributing the specified data to which the key value belongs from the root node to the last layer of index nodes (that is, the index nodes to which the data nodes are subordinate) in the Merkle B+ tree. After the key value is distributed to an index node in the last layer, the key value is in the key range of which data node can be determined by comparing the key value with the key range of each data node subordinate to this index node, and then this data node may be used as the target data node, and the global page identifier of the target data node may be obtained from the data of the index node.

In some embodiments, the first device obtains the data of the index node stored in the disk page of the first device according to the page identifier of the index node, which is equivalent to reading the data of the index node stored in the disk page of the first device corresponding to the page identifier of the index node into a memory of the first device. Subsequently, the first device may modify the data of the index node in the memory of the first device.

It should be noted that any specified data in the data modification set may correspond to a target data node, and the target data node corresponding to the specified data is the target data node to which the specified data needs to be distributed. For example, any key-value pair to be added in the data modification set may correspond to a target data node, and the target data node is the data node that stores the key value of the key-value pair; any key-value pair to be updated in the data modification set may correspond to a target data node, and the target data node is the data node that stores the key value of the key-value pair; any key (i.e., key value) to be deleted in the data modification set may correspond to a target data node, and the target data node is the data node that stores the key value. In this way, the data modification set may correspond to n target data nodes in total, and each target data node corresponds to one or more specified data, that is, each target data node corresponds to one or more key-value pairs to be added, one or more key-value pairs to be updated, and/or one or more keys to be deleted.

In step 303, the first device generates n pieces of mapping information that are in a one-to-one correspondence with the n target data nodes, and sends the n pieces of mapping information to the management module.

Optionally, the n pieces of mapping information may be carried in a data modification instruction and then sent by the first device to the management module, to instruct the management module to update the data nodes in the Merkle B+ tree based on the n pieces of mapping information.

Any piece of the n pieces of mapping information includes the global page identifier of the target data node corresponding to this piece of mapping information, and at least one specified data in the data modification set that needs to be distributed to the target data node corresponding to this piece of mapping information. That is, each piece of mapping information includes a global page identifier and a data list of a target data node, and the data list includes all specified data in the data modification set that needs to be distributed to the target data node. For example, the specified data in the data list may be ordered, for example, the specified data in the data list may be ordered in a dictionary order. Optionally, in the case that a certain target data node has overflow information, the mapping information corresponding to the target data node may also include the overflow information of the target data node.

In step 304, the management module, after receiving the n pieces of mapping information sent by the first device, generates n pieces of data modification information that are in a one-to-one correspondence with the n pieces of mapping information.

It should be noted that a global page identifier has a second device identifier and a local page identifier that are associated. The second device identifier associated with the global page identifier is used to indicate the second device to which the disk page identified by the global page identifier belongs. The local page identifier associated with the global page identifier is used to uniquely identify the disk page in the second device identified by the second device identifier associated with the global page identifier. Optionally, the local page identifier is used to indicate an offset of the disk page in the second device, namely, to indicate a physical location of the file where the disk page is located in the second device.

Any piece of the n pieces of data modification information includes the second device identifier associated with the global page identifier in the mapping information corresponding to the data modification information and a data modification task. The data modification task includes a local page identifier associated with the global page identifier in the mapping information corresponding to the data modification information, and a data list in the mapping information corresponding to this data modification information. Optionally, in a case that a certain piece of mapping information includes overflow information, the data modification task in the data modification information corresponding to this piece of mapping information may also include the overflow information in this piece of mapping information.

For the global page identifier in any piece of the n pieces of mapping information, the management module may determine the second device identifier and the local page identifier associated with the global page identifier, and the specific method of determination has been elaborated in the embodiment of FIG. 1 as above-mentioned, which will not be repeated here.

In step 305: The management module sends the data modification task in any piece of the n pieces of data modification information to the second device identified by the second device identifier in this piece of data modification information.

Optionally, the data modification task may be carried in a data modification message to be sent by the management module to the second device, so as to instruct the second device to update the data node based on the data modification task.

In order to optimize performance, in some embodiments, the management module may use data compression means to reduce the amount of data transmission, to obtain better performances. That is, the management module may first compress the data modification task, and then send the compressed data modification task to the second device. In some other embodiments, if the n pieces of data modification information include multiple pieces of data modification information having a same second device identifier, then the management module may carry the data modification tasks in the multiple pieces of data modification information into a same data modification message and send this data modification message to the second device identified by the second device identifier in the multiple pieces of data modification information. That is to say, the management module may accumulate a batch of data modification tasks that need to be sent to the same second device, and then carry these data modification tasks in one data modification message and send this data modification message to the second device, so as to reduce the total network request rounds in the database system, and improve performances.

For any second device among the plurality of second devices, the second device updates the data nodes in the Merkle B+ tree according to the data modification task if the data modification task sent by the management module is received by the second device.

Optionally, for any data modification task, the operation of the second device to update the data nodes in the Merkle B+ tree according to the data modification task may include the following steps (1) to (5).

(1) The second device obtains data of a target data node stored in a disk page in the second device according to a local page identifier in the data modification task, or according to a local page identifier and overflow information in the data modification task.

If the data modification task does not include the overflow information, then the second device directly obtains the data stored in the disk page identified by the local page identifier in the data modification task as the data of the target data node.

If the data modification task includes the overflow information, then the second device obtains the data stored in consecutive j disk pages starting from the disk page identified in the second device by the local page identifier in the data modification task as the data of the target data node, j is the number of disk pages indicated by the overflow information.

(2) The second device modifies the data of the target data node according to the data list in the data modification task, to update the target data node.

If a key-value pair to be added is existed in the data list in the data modification task, then the second device adds the key-value pair in the data of the target data node. If a key-value pair to be updated is existed in the data list in the data modification task, then the second device updates a specified key-value pair in the data of the target data node to the key-value pair, and a key value of the specified key-value pair is the same as that of the key-value pair. If a key to be deleted is existed in the data list in the data modification task, then the second device deletes the key-value pair to which the key belongs in the data of the target data node. In this way, the update of the target data node can be completed.

In some embodiments, if the updated target data node is null, that is, the updated target data node does not contain data, the second device may send a node deletion message to the management module to indicate that the updated target data node is null.

The management module, after receiving the node deletion message sent by the second device, sends a node deletion message to the first device. The first device, after receiving the node deletion message sent by the management module, may delete the index item of the target data node (including the minimum key, hash value and page identifier of the target data node) in the data of an upper index node of the target data node, and delete the page identifier of the index node contained in the data of the index node, to update the index node. If the updated index node is null, the first device continues to trace back to update an upper index node until the root node is updated. If the updated index node is not null, then the first device allocates the page identifier to the updated index node, and then continues to trace back to update an upper index node according to the minimum key, hash value and page identifier of the updated index node until the root node is updated. In this way, the update of the index nodes in the Merkle B+ tree is completed by the first device.

In other embodiments, if the updated target data node is not null, that is, if the updated target data node contains data, then the second device determines at least one new data node according to the updated target data node, and then requests the management module to allocate a page identifier to each of the at least one new data node, specifically, the following steps (3) to (5) may be included.

(3) If a data volume of the updated target data node is smaller than or equal to a preset data volume, then the second device sends a disk page allocation request to the management module.

In this case, the updated target data node is a new data node. The disk page allocation request carries the minimum key and hash value of the updated target data node. The disk page allocation request is used to request allocation of a page identifier for the updated target data node, that is, to request allocation of a disk page for storing data of the updated target data node.

(4) If the data volume of the updated target data node is greater than the preset data volume, then the second device splits the updated target data node into at least two data nodes, and then sends a disk page allocation request to the management module.

A data volume of each of the at least two data nodes split from the updated target data node is smaller than or equal to the preset data volume, and each data node contains at least one key-value pair.

In this case, the at least two data nodes are new data nodes. The disk page allocation request carries the minimum key and hash value of each of the at least two data nodes. The disk page allocation request is used to request allocation of a page identifier for each of the at least two data nodes, that is, to request allocation of a disk page for storing date of each of the at least two data nodes.

It should be noted that if the data volume of the updated target data node is greater than the preset data volume, while the updated target data node contains only one key-value pair, then the second device does not need to split the updated target data node. In this case, overflow information may be set for the updated target data node according to the data volume of the updated target data node and the preset data volume, for example, the data volume of the updated target data node may be divided by the preset data volume to get a value and the value is then rounded up to obtain the overflow information. In this case, the updated target data node is a new data node, and the second device may send a disk page allocation request to the management module. The minimum key and hash value of the updated target data node and the overflow information are carried in the disk page allocation request.

Optionally, if the data modification message received by the second device only carries one data modification task, then the second device may send a disk page allocation request to the management module after processing the data modification task. And if the data modification message received by the second device carries multiple data modification tasks, the second device may send the disk page allocation request to the management module after processing all the data modification tasks in the data modification message. In this case, the disk page allocation request carries the minimum key and hash value of the new data node (i.e., the updated target data node, or each of the at least two data nodes split from the updated target data node) obtained after all the data modification tasks in the data modification message are processed, furthermore, the disk page allocation request may also carry the overflow information of the new data node.

It should be noted that the second device obtains the data of the target data node stored in the disk page of the second device, which is equivalent to reading the data of the target data node stored in the disk page of the second device into a memory of the second device, and then the data of the target data node is modified in the memory of the second device, to enable an update of the target data node and to obtain a new data node. The second device, after obtaining the new data node, will temporarily store the new data node in the memory first, and then requests the management module to allocate a page identifier.

In this case, the new data node is a logical node existing in the memory of the second device, which requires a unique identifier so that the local page identifier allocated by the management module can be associated with the new data node later. Specifically, the second device may set a unique identifier for the new data node, so that the second device can set a local page identifier for the new data node according to the association relationship after receiving a response from the management module for the disk page allocation request. For example, the second device may identify a new data node of a disk page to be allocated according to a footer of data composed of new data nodes of all disk pages to be allocated and a request identifier of the disk page allocation request, if a reply to the disk page allocation request is subsequently received by the second device, the second device may directly assign values in sequence to the local page identifiers of new data nodes of all disk pages to be allocated in the disk page allocation request according to the association relationship.

(5) The management module, after receiving the disk page allocation request sent by the second device, determines the second device identifier and local page identifier of each new data node indicated in the disk page allocation request, and sends a disk page allocation result carrying the second device identifier and local page identifier of each new data node.

Optionally, the management module internally maintains a freelist component for each of the plurality of second devices, and the freelist component of one second device is used to configure a list of free page identifiers, a list of page identifiers to be released, and a maximum page identifier of the second device. The freelist component of one second device is used to implement the allocation of disk pages in this second device. The management module may allocate the local page identifier for the data nodes in each second device through the freelist component of each second device, so as to realize the allocation of disk pages for the data nodes in each second device.

After a disk page allocation request sent by a second device is received by the management module, if the number of new data nodes indicated in the disk page allocation request is smaller than a first number, the management module allocates a local page identifier for each new data node indicated in the disk page allocation request in the second device. The device identifier of the second device is determined as the second device identifier of each new data node.

After a disk page allocation request sent by a second device is received by the management module, if the number of new data nodes indicated in the disk page allocation request is greater than or equal to the first number, the management module selects a second number of second devices among the plurality of second devices except for this second device, and allocates a local page identifier for each new data node indicated in the disk page allocation request among the first device and the selected second number of second devices according to a preset ratio. The device identifier of the second device to which the local page identifier allocated for each new data node belongs is determined as the second device identifier of each new data node.

In this embodiment, the first number, the second number, and the preset ratio may all be set in advance, for example, the first number, the second number, and the preset ratio may all be set by technicians according to actual needs.

Optionally, the management module may randomly select a second number of second devices among the plurality of second devices except for this second device, or may select a second number of second devices among the plurality of second devices except this second device according to certain rules. For example, the second number of second devices sorted after this second device may be selected.

In the embodiments of the present application, when the number of new data nodes to be allocated disk pages exceeds a certain threshold (i.e., the first number), local page identifiers may be randomly allocated to the new data nodes in different second devices according to a preset ratio. In this way, the data of multiple new data nodes to be allocated disk pages may be distributed to the disk pages of plurality of second devices for storage, and the storage pressure of each second device can be reduced through this distributed storage method.

For example, in case that three second devices are currently included, namely, a second device 1, a second device 2, and a second device 3, a disk page allocation request sent by the second device 1 is received by the management module, and the disk page allocation request indicates that the number of new data nodes is 100, which exceeds the threshold of 80, then the second device 1 may be allocated 80 local page identifiers of new pages, and the second device 2 and the second device 3 are respectively allocated 10 local page identifiers of new pages according to a ratio of 8:1:1. It should be noted that the new page mentioned here may be one disk page, or multiple consecutive disk pages. Specifically, if a new data node to be allocated a disk page is not provided with overflow information, then one disk page is allocated to this new data node, and in this case, one local page identifier is allocated to this new data node. If a new data node to be allocated a disk page is provided with overflow information, then the new data node needs to be allocated multiple consecutive disk pages, in this case, it is necessary to allocate multiple consecutive local page identifiers for this new data node.

After the management module allocates a local page identifier in the second device to a new data node indicated in the disk page allocation request, the new data node has a second device identifier and a local page identifier, to indicate that the new data node is allocated the disk page identified by the local page identifier in the second device identified by the second device identifier, that is, to indicate that the data of the new data node is stored in the disk page identified by the local page identifier in the second device identified by the second device identifier.

In this case, for a second device that sends the disk page allocation request to the management module, the management module may carry the local page identifier and the corresponding second device identifier allocated to each new data node indicated by the disk page allocation request in a disk page allocation result and return the disk page allocation result to this second device.

After the second device receives the disk page allocation result, for any second device identifier and global page identifier of a new data node in the disk page allocation result, if the second device identifier of the new data node is the same as the device identifier of the second device, then the second device may store the data of the new data node in the disk page identified by the local page identifier of the new data node. If the second device identifier of the new data node is different from the device identifier of the second device, then the second device may carry the local page identifier of the new data node and the data of the new data node in a data storage message and send the data storage message to the second device identified by the second device identifier of the new data node. The second device identified by the second device identifier of the new data node, after receiving the data storage message, may store the data of the new data node to the disk page identified by the local page identifier of this new data node. Optionally, the second device, when sending a data storage message to the second device identified by the second device identifier of the new data node, may use means such as data compression to reduce the amount of data transmission, so as to obtain better performance. After the second device stores the data of each updated new data node in the disk pages of the second device, the persistence of the data nodes of the Merkle B+ tree is realized.

The management module, after allocating a local page identifier in a second device to a new data node, may also determine an associated global page identifier according to the device identifier of the second device and the local page identifier. Then, the management module may send a data modification result to the first device, and the data modification result includes the minimum key, hash value and global page identifier of each new data node, and may further include overflow information of the new data node. The first device, after receiving the data modification result, may update the index nodes in the Merkle B+ tree according to the minimum key, hash value, global page identifier, and overflow information of each new data node in the data modification result. Specifically, the first device updates an index item of the target data node in the data of the index node to which the target data node is subordinate to an index item of the new data node (including the minimum key hash value, page identifier, and overflow information of the new data node), and deletes the page identifier of the index node contained in the data of the index node, to update the index node. If the data volume of the updated index node is smaller than or equal to the preset data volume, then the first device allocates a page identifier to the updated index node, and then continues to retroactively update upper index nodes according to the minimum key, hash value and page identifier of the updated index node until the root node is updated. If the data volume of the updated index node is greater than the preset data volume, then the first device splits the updated index node into at least two index nodes, and the data volume of each of the at least two index nodes is smaller than or equal to the preset data volume, each of the at least two index nodes contains an index item of the at least one data node, and the first device allocates a page identifier to each of the at least two index nodes, and then continues to retroactively update the upper index nodes according to the minimum key, hash value and page identifier of each of the at least two index nodes until the root node is updated. In this way, the update of the index nodes in the Merkle B+ tree is completed by the first device.

The first device may store the data of each updated index node in the disk pages of the first device. Specifically, the first device may store the data of each updated index node in the disk page identified by the page identifier of each index node in the first device. After the first device stores the data of each updated index node in the disk pages of the first device, the persistence of the index nodes of the Merkle B+ tree is realized.

It should be noted that after the update of the index nodes in the Merkle B+ tree is completed by the first device, the first device may obtain the data of the root node in the Merkle B+ tree, at this time, the first device may determine that the execution progress of the current block is in a completed state. Afterwards, the first device may obtain the hash value of the root node according to the data of the root node, and return the hash value of the root node to an upper blockchain system. Moreover, the first device may also record a mapping relationship between the page identifier of the root node and the block identifier of the current block, so as to determine which version of the Merkle B+ tree the page identifier of the root node corresponds to. The blockchain system, after receiving the hash value of the root node sent by the first device, may determine that the execution of the current block has been completed, and at this time, the blockchain system can start to execute a next block.

For performance considerations, in terms of the second device, a flushing process for local dirty pages (that is, the process of storing the data of the new data node to the disk page identified by the local page identifier of the new data node) may be handed over to the background asynchronous brushing logic to start execution after the local page identifiers of the dirty pages are determined. In this case, after the second device completes the background asynchronous flushing logic, that is, after the second device stores the data of the corresponding new data node in its own disk page or sends the data of the new data node to other second devices for storage according to the disk page allocation result sent by the management module, the second device can reply a notification message to the management module to indicate that the corresponding data modification task has been processed, and by means of this, the management module can determine at what point in time all data modification tasks in the n pieces of data modification information have been processed.

The management module, after determining that all data modification tasks in the n pieces of data modification information have been processed, may send a persistence completion message to the first device. The first device, after receiving the persistence completion message, determines that the execution progress of the current block is in a placed-on-disk state in case that the data of all updated index nodes have been stored in the disk pages of the first device. Afterwards, the first device sends a persistence completion message to the blockchain system to indicate that the current block has been placed on the disk.

In the embodiments of the present application, the database system includes a first device, a management module, and a data system. The data system includes a plurality of second devices. The first device is configured to store the data of the index nodes in the Merkle B+ tree. The plurality of second devices is configured to store the data of the data nodes in the Merkle B+ tree. When the Merkle B+ tree needs to be updated, the first device obtains the global page identifier of the target data node to which each specified data in the data modification set needs to be distributed in the Merkle B+ tree, so as to obtain the global page identifier of each of the n target data nodes. Afterwards, the first device generates n pieces of mapping information in a one-to-one correspondence with the n target data nodes, and sends the n pieces of mapping information to the management module, each of the n pieces of mapping information includes a global page identifier and a data list of the corresponding target data node. Afterwards, the management module generates n pieces of data modification information in a one-to-one correspondence with the n pieces of mapping information, and each data modification information includes the second device identifier associated with the global page identifier in the corresponding mapping information and a data modification task. The management module sends the data modification task in any piece of the n pieces of data modification information to the second device identified by the second device identifier in this piece of data modification information, so as to instruct the second device to update the data node. In this way, through this distributed architecture in the database system, the update and storage pressure of the data nodes in the Merkle B+ tree can be distributed to the plurality of second devices in the data system, which can reduce the data update and storage pressure of a single device. storage pressure, so as to increase the throughput of the database system, thereby improving the performance of the database system.

It should be noted that a modification for data of the nodes of the Merkle B+ tree may be realized through the above steps 301 to 305.

In some embodiments, the data of the nodes of the Merkle B+ tree may also be queried, and the specific query process may include the following steps a to e.

In step a, a data query request is received by the first device receives, where a key value to be queried is carried in the data query request.

The data query request is used to instruct to query of a value value corresponding to the key value carried in the data query request in the Merkle B+ tree. The data query request may be sent to the first device by other systems. For example, the execution module in the blockchain system will generate a key value that needs to be queried during the process of executing a transaction in a block. In this case, a data query request carrying the key value may be sent by the execution module to the first device.

In step b, the first device obtains a global page identifier of a data node to which the key value needs to be distributed in the Merkle B+ tree, and sends a data query instruction to the management module. The data query instruction carries the key value to be queried and the global page identifier of the data node.

The data query instruction is used to instruct to query the value value corresponding to the key value carried by the data query instruction in the data of the data node stored in the disk page identified by the global page identifier.

In step c, the management module, after receiving the data query instruction, determines a second device identifier and a local page identifier associated with the global page identifier in the data query instruction, and sends a data query message to the second device identified by the second device identifier. The data query message carries the key value to be queried and the local page identifier.

In step d, the second device, after receiving the data query message, obtains the data of the data node from the disk page identified by the local page identifier in the second device, and obtains a value value in the key-value pair to which the key value belongs from the data of the data node, and sends the data query result carrying the value value to the management module.

In step e: the management module, after receiving a data query result, returns the data query result to the first device.

The first device, after receiving the data query result, may return the value value in the data query result to the blockchain system.

In some embodiments, version rollback may also be performed on the Merkle B+ tree, which will be described below:

The blockchain system can guarantee that rollback and block generation will not be executed concurrently, that is, the rollback process needs to be performed after one block is executed and before another block starts to be executed.

If the blockchain system needs to roll back the target block and all blocks after the target block, that is, if the blockchain system needs to roll back to a previous block of the target block, then the blockchain system may send a rollback request to the first device, and the rollback request carries a target block identifier, to indicate that the target block and all blocks after the target block need to be rolled back, that is, the target block and all blocks after the target block in a corresponding version of the Merkle B+ tree need to be rolled back, in other words, the data of the nodes of the Merkle B+ tree are rolled back to the data of the nodes of the corresponding version of the Merkle B+ tree of the previous block of the target block.

The first device, after receiving the rollback request, needs to determine the execution progress of the current block. If the execution progress of the current block is not in a placed-on-disk state, then the first device needs to wait until the execution progress of the current block is in the placed-on-disk state, and then send a rollback instruction to the management module. The rollback instruction may carry the target block identifier. The management module, after receiving the rollback instruction, may delete version information corresponding to the target block identified by the target block identifier and all blocks after the target block. The version information corresponding to a certain block is the information recorded during the process of processing the data modification set corresponding to this block. For example, the version information corresponding to a certain block may include modified contents of the freelist component corresponding to this block. In this way, after the version information corresponding to the target block and all blocks after the target block is deleted, the block corresponding to the latest version information recorded in the management module is the previous block of the target block, so the rollback to the data of data nodes of the corresponding version of the Merkle B+ tree of the previous block of the target block is achieved. Afterwards, the management module may send a rollback completion message to the first device.

The first device, after receiving the rollback completion message sent by the management module, may delete the data of the root node corresponding to the target block and all blocks after the target block, and delete the identifiers of the target block and all blocks after the target block. In this way, the latest block recorded in the first device is the previous block of the target block, and the latest version of the recorded Merkle B+ tree is the Merkle B+ tree to which the data of the root node corresponding to the previous block of the target block belongs, thus the rollback to the data of the index nodes of the corresponding version of the Merkle B+ tree of the previous block of the target block is achieved.

Figure 3:
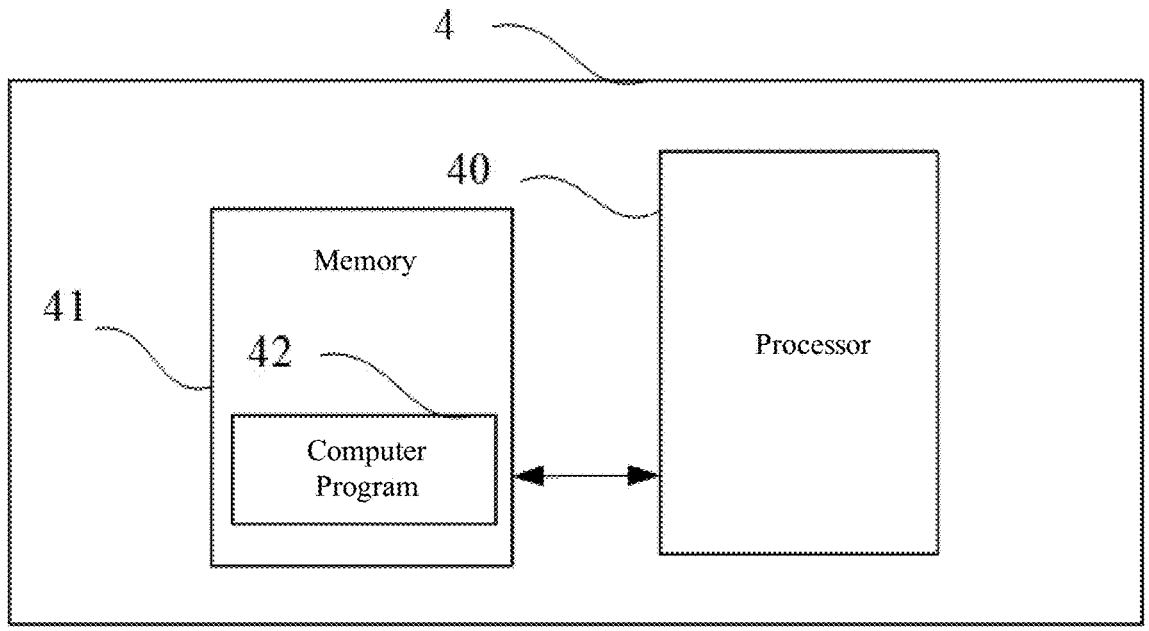
FIG. 3 is a schematic structural diagram of a computer equipment in accordance with an embodiment of the present application.

FIG. 3 is a schematic structural diagram of computer equipment provided by an embodiment of the present application. As shown in FIG. 3, the computer equipment 4 includes: a processor 40, a memory 41, and a computer program 42 stored in the memory 41 and executable by the processor 40. When the computer program 42 is executed by the processor 40, operations performed by the first device, the management module, or the second device in the method for data processing in the above-mentioned embodiments are realized.

The computer equipment 4 may be a general-purpose computer equipment or a special purpose computer equipment. In a specific implementation, the computer equipment 4 may be a desktop computer, a portable computer, a network server, a palmtop computer, a mobile phone, a tablet computer, a wireless terminal device, a communication device or an embedded device, and the embodiments of the present application do not limit the type of the computer equipment 4. It can be understood for those skilled in the art that FIG. 3 is only an example of the computer equipment 4, and does not constitute a limitation to the computer equipment 4. The computer equipment may include more or less components than those shown in the figure, or combine some components, or different components. For example, the computer equipment may also include input and output devices, network access devices, and the like.

The processor 40 may be a central processing unit (CPU), and the processor 40 may also be other general-purpose processors, a digital signal processor (DSP), an application specific integrated circuit (ASIC), a field-programmable gate array (FPGA) or other programmable logic devices, discrete gate or transistor logic devices, discrete hardware components, etc. The general-purpose processor may be a microprocessor or any conventional processor.

The memory 41 may be an internal storage unit of the computer equipment 4 in some embodiments, such as a hard disk or a memory of the computer equipment 4. The memory 41 may also be an external storage device of the computer equipment 4 in other embodiments, such as a plug-in hard disk equipped on the computer equipment 4, a smart memory card (SMC), a secure digital (SD) card, a flash card, etc. Further, the memory 41 may also include both an internal storage unit of the computer equipment 4 and an external storage device. The memory 41 is used to store operating systems, application programs, boot loaders, data, and other programs. The memory 41 may also be used to temporarily store data that has been output or will be output.

An embodiment of the present application provides computer equipment, the computer equipment includes a memory, a processor, and a computer program stored in the memory and executable by the processor. The computer program, when executed by the processor, enables the steps in the foregoing method embodiments to be implemented.

An embodiment of the present application provides a computer-readable storage medium, where a computer program is stored in the computer-readable storage medium, and when the computer program is executed by a processor, the steps in the foregoing method embodiments may be implemented.

An embodiment of the present application provides a computer program product, which, when running on a computer, causes the computer to execute the steps in the above method embodiments.

Based on this understanding, all or part of the processes in the above method embodiments of the present application may be completed by related hardware through a computer program, and the computer program may be stored in a computer-readable storage medium. The computer program, when executed by a processor, causes the steps in the foregoing method embodiments to be implemented. The computer program includes computer program codes, and the computer program codes may be source codes, object codes, executable file or may be some intermediate forms. The computer-readable medium may at least include: any entity or device capable of carrying computer program codes to a photographing device/terminal equipment, a recording medium, a computer memory, a read-only memory (ROM), a random-access memory (RAM), a compact disc read-only memory (CD-ROM), a magnetic tape, a floppy disk and an optical data storage device, etc. The computer-readable storage medium mentioned in the present application may be a non-volatile storage medium, in other words, may be a non-transitory storage medium.

It should be understood that all or part of the steps of the above embodiments may be implemented by software, hardware, firmware or any combination thereof. When implemented by software, it may be implemented in whole or in part in the form of a computer program product. The computer program product includes one or more computer instructions. The computer instructions may be stored in the computer-readable storage medium described above.

In the above embodiments, the descriptions of each embodiment have their own emphases, and for parts that are not detailed or recorded in a certain embodiment, reference may be made to relevant descriptions of other embodiments.

It can be appreciated by those skilled in the art that units and algorithm steps of the examples described in conjunction with the embodiments disclosed herein may be implemented by electronic hardware, or a combination of computer software and electronic hardware. Whether these functions are executed by hardware or software depends on the specific application and design constraints of the technical solutions. Other methods may be used by skilled artisans to implement the described functions for each specific application, and such implementations should not be regarded as exceeding the scope of the present application.

A unit described as a separate component may or may not be physically separated, and a component displayed as a unit may or may not be a physical unit, that is, those units or components may be located in one place, or may be distributed to multiple network units. Part or all of the units may be selected according to actual needs to achieve the objective of solution of this embodiment.

The above embodiments are merely used to illustrate the technical solutions of the present application, and are not intended to limit the present application. Although the present application has been described in detail with reference to the foregoing embodiments, those of ordinary skills in the art should understand that the technical solutions described in the foregoing embodiments may still be modified, or some or all of the technical features thereof may be equivalently substituted; and these modifications or substitutions do not deviate the essence of the corresponding technical solutions from the scope pf the technical solutions of the various embodiments of the present application, and shall all be included within the protection scope of the present application.

What is claimed is:

1. A method for data processing, applied to a management module in a database system, and the database system comprising a first device, the management module and a data system, and the data system comprising a plurality of second devices, the first device configured to store data of index nodes in a Merkle B+ tree, and the plurality of second devices configured to store data of data nodes in the Merkle B+ tree, and the method comprising:

receiving n pieces of mapping information sent by the first device, wherein the n pieces of mapping information are in a one-to-one correspondence with n target data nodes, and the n target data nodes are data nodes to which specified data in a data modification set needs to be distributed in the Merkle B+ tree, each of the n pieces of mapping information comprises a global page identifier and a data list of a corresponding target data node, and the data list comprises at least one specified data in the data modification set that needs to be distributed to the corresponding target data node, wherein, the n is a positive integer;

generating n pieces of data modification information in a one-to-one correspondence with the n pieces of mapping information, wherein each of the n pieces of data modification information comprises a second device identifier associated with a global page identifier in corresponding mapping information and a data modification task, wherein the data modification task comprises a local page identifier associated with the global page identifier in the corresponding mapping information and a data list in the corresponding mapping information; and sending a data modification task in any piece of the n pieces of data modification information to a second device identified by the second device identifier in this piece of data modification information, wherein the data modification task is configured to indicate an update of the data nodes in the Merkle B+ tree.

2. The method according to claim 1, wherein said sending the data modification task in any piece of the n pieces of data modification information to the second device identified by the second device identifier in this piece of data modification information comprises:

carrying, if multiple pieces of data modification information containing a same second device identifier are included in the n pieces of data modification information, data modification tasks in the multiple pieces of data modification information in a same data modification message and sending the same data modification message to a second device identified by the same second device identifier in the multiple pieces of data modification information.

3. The method according to claim 1, wherein, after said sending the data modification task in any piece of the n pieces of data modification information to the second device identified by the second device identifier in this piece of data modification information, the method further comprises:

receiving a disk page allocation request sent by one second device from the plurality of second devices, wherein the disk page allocation request is used to request allocation of a page identifier for each of at least one new data node, and the at least one new data node is determined according to the data modification task;

determining a second device identifier and a local page identifier of each of the at least one new data node indicated in the disk page allocation request; and sending a disk page allocation result carrying the second device identifier and the local page identifier of each of the at least one new data node to the one second device from the plurality of second devices.

4. The method according to claim 3, wherein said determining the second device identifier and the local page identifier of each of the at least one new data node indicated in the disk page allocation request comprises:

allocating, in the one second device, a local page identifier to each of the at least one new data node indicated in the disk page allocation request, and determining a device identifier of the one second device as the second device identifier of the at least one new data node, if a number of new data nodes indicated in the disk page allocation request is smaller than a first number; and selecting a second number of second devices from the plurality of second devices excluding the one second device; allocating, in the one second device and the second number of second devices that have been selected, local page identifiers to the new data nodes indicated in the disk page allocation request according to a preset ratio, and determining device identifiers of the second devices to which the local page identifiers allocated to the new data nodes belong as second device identifiers of the new data nodes, in case that the number of new data nodes indicated in the disk page allocation request is greater than or equal to the first number.

5. The method according to claim 3, wherein, after said determining the second device identifier and the local page identifier of each of the at least one new data node indicated in the disk page allocation request, the method further comprises:

determining a global page identifier of each new data node according to the second device identifier and the local page identifier of each new data node indicated in the disk page allocation request; and sending a data modification result to the first device, wherein a minimum key, a hash value and the global page identifier of each new data node are carried in the data modification result, and the data modification result is used to indicate an update of the index nodes in the Merkle B+ tree.

6. The method according to claim 1, wherein the data modification set has a corresponding block, the data modification set is generated after transactions in the corresponding block are executed, and the method further comprises:

receiving a device addition instruction sent by the first device, wherein a target device identifier and a specified block identifier are carried in the device addition instruction, the device addition instruction is used to indicate an addition of a device identified by the target device identifier and to indicate that the device newly added is enabled from a block identified by the specified block identifier; and adding the specified block identifier and the target device identifier to device topology meta-information of the data system.

7. The method according to claim 6, wherein a preset value of an initial second device in the data system is 0; and wherein said adding the specified block identifier and the target device identifier to the device topology meta-information of the data system comprises:

determining a maximum global page identifier that has been allocated as a demarcation point of global page identifier, determining a number of old devices and a number of new devices corresponding to the demarcation point of global page identifier, determining a limit local page identifier of each second device in the data system according to the demarcation point of global page identifier, and determining a preset value of a device identified by the target device identifier according to the limit local page identifier of each second device in the data system, a preset value of the device identified by the target device identifier is a global page identifier corresponding to a local page identifier that is 1 greater than the limit local page identifier of the second device having a minimum device identifier in the data system after the device is added; and adding device dynamic information to the device topology meta-information of the data system, wherein the device dynamic information comprises the specified block identifier, the target device identifier, the demarcation point of global page identifier, the limit local page identifier of each second device in the data system, the number of old devices and the number of new devices corresponding to the demarcation point of global page identifier, the preset value of the device identified by the target device identifier, and the device dynamic information is used to realize a conversion between the global page identifier and the second device identifier and the local page identifier that are associated.

8. The method according to claim 7, further comprising:

during an execution of a block whose block identifier is greater than or equal to the specified block identifier, performing, if a global page identifier sent by the first device is received, a modulo operation on the number of old devices corresponding to the global page identifier and the demarcation point of global page identifier to obtain a second device identifier associated with the global page identifier, subtracting the global page identifier by the preset value of the second device identified by the second device identifier associated with the global page identifier and dividing a value obtained through subtraction operation by the number of old devices corresponding to the demarcation point of global page identifier, and rounding down a value obtained through division operation to obtain a local page identifier associated with the global page identifier, in case that the global page identifier is smaller than or equal to the demarcation point of global page identifier; and performing a modulo operation on the number of new devices corresponding to the global page identifier and the demarcation point of global page identifier to obtain the second device identifier associated with the global page identifier, subtracting the global page identifier by the preset value of the second device identified by the second device identifier associated with the global page identifier and dividing a value obtained through subtraction operation by the number of new devices corresponding to the demarcation point of global page identifier, and rounding down a value obtained through division operation to obtain a local page identifier associated with the global page identifier, in case that the global page identifier is greater than the demarcation point of global page identifier.

9. The method according to claim 7, further comprising:
during an execution of a block whose block identifier is greater than or equal to the specified block identifier, accumulating, if a local page identifier is allocated to a data node in a second device, a device identifier of the second device, a preset value of the second device and a value that is obtained through an operation of multiplying the number of old devices corresponding to the demarcation point of global page identifier by the local page identifier, to obtain a global page identifier associated with the device identifier of the second device and the local page identifier, in case that the device identifier of the second device is not the target device identifier and the local page identifier is smaller than or equal to the limit local page identifier of the second device;
accumulating the device identifier of the second device, the preset value of the second device and a value that is obtained through an operation of multiplying the number of new devices corresponding to the demarcation point of global page identifier by the local page identifier, to obtain a global page identifier associated with the device identifier of the second device and the local page identifier, in the case that the device identifier of the second device is not the target device identifier, and the local page identifier is greater than the limit local page identifier of the second device; and
accumulating the device identifier of the second device, the preset value of the second device and the value that is obtained through the operation of multiplying the number of new devices corresponding to the demarcation point of global page identifier by the local page identifier, to obtain a global page identifier associated with the device identifier of the second device and the local page identifier, in the case that the device identifier of the second device is the target device identifier.

10. The method according to claim 8, further comprising:
during an execution of a block whose block identifier is greater than or equal to the specified block identifier, accumulating, if a local page identifier is allocated to a data node in a second device, a device identifier of the second device, a preset value of the second device and a value that is obtained through an operation of multiplying the number of old devices corresponding to the demarcation point of global page identifier by the local page identifier, to obtain a global page identifier associated with the device identifier of the second device and the local page identifier, in case that the device identifier of the second device is not the target device identifier and the local page identifier is smaller than or equal to the limit local page identifier of the second device;
accumulating the device identifier of the second device, the preset value of the second device and a value that is obtained through an operation of multiplying the number of new devices corresponding to the demarcation point of global page identifier by the local page identifier, to obtain a global page identifier associated with the device identifier of the second device and the local page identifier, in the case that the device identifier of the second device is not the target device identifier, and the local page identifier is greater than the limit local page identifier of the second device; and
accumulating the device identifier of the second device, the preset value of the second device and the value that is obtained through the operation of multiplying the number of new devices corresponding to the demarcation point of global page identifier by the local page identifier, to obtain a global page identifier associated with the device identifier of the second device and the local page identifier, in the case that the device identifier of the second device is the target device identifier.

11. A non-transitory computer-readable storage medium, which stores a computer program that, when executed by a processor, implements the method according to claim 1.

12. A method for data processing, applied to a database system, the database system comprising a first device, a management module and a data system, the data system comprising a plurality of second devices, the first device configured to store data of index nodes in a Merkle B+ tree, and the plurality of second devices configured to store data of data nodes in the Merkle B+ tree, and the method comprising:
obtaining, by the first device, a global page identifier of a target data node to which each specified data in a data modification set needs to be distributed in the Merkle B+ tree, to obtain the global page identifier of each of n target data nodes, wherein, the n is a positive integer;
generating, by the first device, n pieces of mapping information in a one-to-one correspondence with the n target data nodes, and sending the n pieces of mapping information to the management module, wherein each of the n pieces of mapping information comprises a global page identifier of a corresponding target data node and a data list, the data list comprises at least one specified data in the data modification set that needs to be distributed to the corresponding target data node;
generating, by the management module, n pieces of data modification information in a one-to-one correspondence with the n pieces of mapping information after the n pieces of mapping information sent by the first device are received by the management module, wherein each of the n pieces of data modification information comprises a second device identifier associated with a global page identifier in corresponding mapping information and a data modification task, and the data modification task comprises a local page identifier associated with the global page identifier in the corresponding mapping information and a data list in the corresponding mapping information;
sending, by the management module, a data modification task in any piece of the n pieces of data modification information to a second device identified by the second device identifier in this piece of data modification information, and the data modification task is used to indicate an update of the data nodes in the Merkle B+ tree.

13. The method according to claim 12, wherein after the data modification task in any piece of the n pieces of data modification information is sent by the management module to the second device identified by the second device identifier in this piece of data modification information, the method further comprises:
obtaining, by a second device which is any one of the plurality of second devices that has received the data modification task sent by the management module, data of the target data node stored in a disk page of the second device according to a local page identifier in the data modification task;
modifying, by the second device, the data of the target data node according to the data list in the data modification task, to update the target data node;
determining, by the second device, at least one new data node according to the updated target data node, and requesting the management module to allocate a page identifier to each of the at least one new data node.

14. The method according to claim 13, wherein said determining, by the second device, at least one new data node according to the updated target data node, and requesting the management module to allocate the page identifier to each of the at least one new data node comprises:

determining, by the second device, the updated target data node as a new data node, and sending a disk page allocation request to the management module, in case that a data volume of the updated target data node is smaller than or equal to a preset data volume;

splitting, by the second device, the updated target data node into at least two data nodes, determining the at least two data nodes are all new data nodes, and sending a disk page allocation request to the management module, in case that the data volume of the updated target data node is greater than the preset data volume; and determining, by the management module after receiving the disk page allocation request sent by the second device, a second device identifier and a local page identifier of each new data node indicated in the disk page allocation request, and sending a disk page allocation result carrying the second device identifier and the local page identifier of each new data node to the second device.

15. The method according to claim 14, wherein after the disk page allocation result carrying the second device identifier and local page identifier of each new data node is sent by the management module to the second device, the method further comprises:

for the second device identifier and the local page identifier of any one of the new data nodes in the disk page allocation result, storing, by the second device after receiving the disk page allocation result sent by the management module, data of the new data node in a disk page identified by the local page identifier of the new data node among disk pages of the second device, in case that the second device identifier of the new data node is the same as a device identifier of the second device;

carrying, by the second device, the local page identifier of the new data node and the data of the new data node in a data storage message, and sending the data storage message to a second device identified by the second device identifier of the new data node, in case that the second device identifier of the new data node is different from the device identifier of the second device, wherein the second device identified by the second device identifier of the new data node stores the data of the new data node in the disk page identified by the local page identifier of the new data node among disk pages of this second device.

16. The method according to claim 14, wherein the data modification set has a corresponding block, the data modification set is generated after transactions in the corresponding block are executed, and the method further comprises:

determining, by the first device, an execution progress of a current block after a device addition request carrying a target device identifier is received by the first device;

determining, by the first device, that a block identifier of a block next to a latest executed block is a specified block identifier in case that the execution progress of the current block is in a completed state;

carrying, by the first device, the target device identifier and the specified block identifier in a device addition instruction, and sending the device addition instruction to the management module, to instruct an addition of a device identified by the target device identifier and to indicate that a device newly-added is enabled from the block identified by the specified block identifier; and adding, by the management module, the specified block identifier and the target device identifier to device topology meta-information of the data system after the device addition instruction sent by the first device is received by the management module.

17. The method according to claim 13, wherein the data modification set has a corresponding block, the data modification set is generated after transactions in the corresponding block are executed, and the method further comprises:

determining, by the first device, an execution progress of a current block after a device addition request carrying a target device identifier is received by the first device;

determining, by the first device, that a block identifier of a block next to a latest executed block is a specified block identifier in case that the execution progress of the current block is in a completed state;

carrying, by the first device, the target device identifier and the specified block identifier in a device addition instruction, and sending the device addition instruction to the management module, to instruct an addition of a device identified by the target device identifier and to indicate that a device newly-added is enabled from the block identified by the specified block identifier; and adding, by the management module, the specified block identifier and the target device identifier to device topology meta-information of the data system after the device addition instruction sent by the first device is received by the management module.

18. The method according to claim 12, wherein the data modification set has a corresponding block, the data modification set is generated after transactions in the corresponding block are executed, and the method further comprises:

determining, by the first device, an execution progress of a current block after a device addition request carrying a target device identifier is received by the first device;

determining, by the first device, that a block identifier of a block next to a latest executed block is a specified block identifier in case that the execution progress of the current block is in a completed state;

carrying, by the first device, the target device identifier and the specified block identifier in a device addition instruction, and sending the device addition instruction to the management module, to instruct an addition of a device identified by the target device identifier and to indicate that a device newly-added is enabled from the block identified by the specified block identifier; and adding, by the management module, the specified block identifier and the target device identifier to device topology meta-information of the data system after the device addition instruction sent by the first device is received by the management module.

19. Computer equipment, comprising a memory, a processor, and a computer program stored in the memory and executable by the processor, wherein the computer program, when executed by the processor, causes the processor to perform steps of a method for data processing that is applied to a management module in a database system, wherein the database system comprises a first device, the management module and a data system, the data system comprises a plurality of second devices, the first device configured to store data of index nodes in a Merkle B+ tree, and the plurality of second devices configured to store data of data nodes in the Merkle B+ tree, and wherein the steps comprise:

receiving n pieces of mapping information sent by the first device, wherein the n pieces of mapping information are in a one-to-one correspondence with n target data nodes, and the n target data nodes are data nodes to which specified data in a data modification set needs to be distributed in the Merkle B+ tree, each of the n pieces of mapping information comprises a global page identifier and a data list of a corresponding target data node, and the data list comprises at least one specified data in the data modification set that needs to be distributed to the corresponding target data node, wherein, the n is a positive integer;

generating n pieces of data modification information in a one-to-one correspondence with the n pieces of mapping information, wherein each of the n pieces of data modification information comprises a second device identifier associated with a global page identifier in corresponding mapping information and a data modification task, wherein the data modification task comprises a local page identifier associated with the global page identifier in the corresponding mapping information and a data list in the corresponding mapping information; and sending a data modification task in any piece of the n pieces of data modification information to a second device identified by the second device identifier in this piece of data modification information, wherein the data modification task is configured to indicate an update of the data nodes in the Merkle B+ tree.

\* \* \* \* \*